United States Patent
Fechter

(10) Patent No.: US 9,177,218 B2
(45) Date of Patent: Nov. 3, 2015

(54) SYSTEM AND METHOD, AND COMPUTER PROGRAM PRODUCT FOR DETECTING AN EDGE IN SCAN DATA

(75) Inventor: Joel S. Fechter, Irvine, CA (US)

(73) Assignee: Kofax, Inc., Irvine, CA (US)

( * ) Notice: Subject to any disclaimer, the term of this patent is extended or adjusted under 35 U.S.C. 154(b) by 1914 days.

(21) Appl. No.: 12/206,594

(22) Filed: Sep. 8, 2008

(65) Prior Publication Data

US 2010/0060910 A1    Mar. 11, 2010

(51) Int. Cl.
  *H04N 1/46*    (2006.01)
  *G06K 9/32*    (2006.01)
  *G06K 9/00*    (2006.01)
  *G06T 7/00*    (2006.01)

(52) U.S. Cl.
  CPC ............. *G06K 9/32* (2013.01); *G06K 9/00449* (2013.01); *G06T 7/0083* (2013.01); *G06T 2207/10008* (2013.01); *G06T 2207/30176* (2013.01)

(58) Field of Classification Search
  USPC ............... 358/538, 2.1, 1.9; 382/199, 167
  See application file for complete search history.

(56) References Cited

U.S. PATENT DOCUMENTS

| | | | |
|---|---|---|---|
| 4,656,665 A | 4/1987 | Pennebaker | 382/51 |
| 5,268,967 A | 12/1993 | Jang et al. | 382/6 |
| 5,781,665 A | 7/1998 | Cullen et al. | 382/254 |
| 6,337,925 B1 | 1/2002 | Cohen et al. | 382/199 |
| 6,621,595 B1 * | 9/2003 | Fan et al. | 358/3.26 |
| 6,701,009 B1 | 3/2004 | Makoto et al. | 382/164 |
| 6,757,427 B1 | 6/2004 | Hongu | 382/164 |
| 6,839,466 B2 * | 1/2005 | Venable | 382/199 |
| 7,145,699 B2 | 12/2006 | Dolan | 358/452 |
| 2004/0022437 A1 * | 2/2004 | Beardsley | 382/199 |
| 2005/0180628 A1 | 8/2005 | Curry et al. | 382/164 |
| 2005/0226510 A1 | 10/2005 | Eguchi et al. | 382/199 |
| 2006/0039611 A1 | 2/2006 | Rother et al. | 382/199 |
| 2006/0115153 A1 | 6/2006 | Bhattacharjya | 382/173 |
| 2007/0086667 A1 | 4/2007 | Dai et al. | 382/242 |
| 2007/0133862 A1 | 6/2007 | Gold et al. | 382/149 |

* cited by examiner

*Primary Examiner* — Vincent Rudolph
*Assistant Examiner* — Michael Burleson
(74) *Attorney, Agent, or Firm* — Zilka-Kotab, PC

(57) ABSTRACT

A system, method, and computer program product are provided for detecting an edge in scan data. In use, RGB scan data is analyzed for determining an approximate location of a background in the scan data representing a background adjacent a document having a similar color as the background. Additionally, a threshold is set for at least one of R, G and B, where the threshold is based in part on RGB values of the background and a predefined color threshold. Further, an intensity threshold is set. Further still, the scan data is analyzed using the thresholds for generating distribution points. Also, a first edge of the document is detected based on a location of a contour in the distribution points. In addition, the scan data and information about the detected edge are output.

25 Claims, 5 Drawing Sheets

SYSTEM AND METHOD, AND COMPUTER PROGRAM PRODUCT FOR DETECTING AN EDGE IN SCAN DATA

FIELD OF THE INVENTION

The present invention relates to scanning, and more particularly to scanning and processing documents.

BACKGROUND

The scanning of documents is widespread and scanned documents are used for a variety of purposes. However, difficulties with the scanning may occur under many circumstances. For example, similarities in color between the document that is to be scanned and the scanner background, in addition to environmental factors such as streaks, dust particles, and dead scanner pixels, may affect the processing of a scanned document. These and other factors may affect the overall quality of the scan, including reducing the accuracy of the scan and increasing the time taken to perform the scanning and analysis of the document.

There is thus a need for addressing these and/or other issues associated with the prior art.

SUMMARY

A system, method, and computer program product are provided for detecting an edge in scan data. In use, RGB scan data is analyzed for determining an approximate location of a background in the scan data representing a background adjacent a document having a similar color as the background. Additionally, a threshold is set for at least one of R, G and B, where the threshold is based in part on RGB values of the background and a predefined color threshold. Further, an intensity threshold is set. Further still, the scan data is analyzed using the thresholds for generating distribution points. Also, a first edge of the document is detected based on a location of a contour in the distribution points. In addition, the scan data and information about the detected edge are output.

A system, method, and computer program product are provided for detecting an edge in scan data. In use, RGB scan data is analyzed for determining an approximate location of a background in the scan data representing a background adjacent a document having a similar color as the background. Additionally, a threshold is set for at least one of R, G and B. Further, an intensity threshold is set, wherein the intensity threshold is set below a predefined color threshold. Further still, the scan data is analyzed using the thresholds for generating distribution points. Also, a first edge of the document is detected based on a location of a contour in the distribution points. In addition, noise is filtered out by analyzing sets of adjacent pixels of the scan data using the thresholds. Furthermore, the scan data and information about the detected edge are output.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
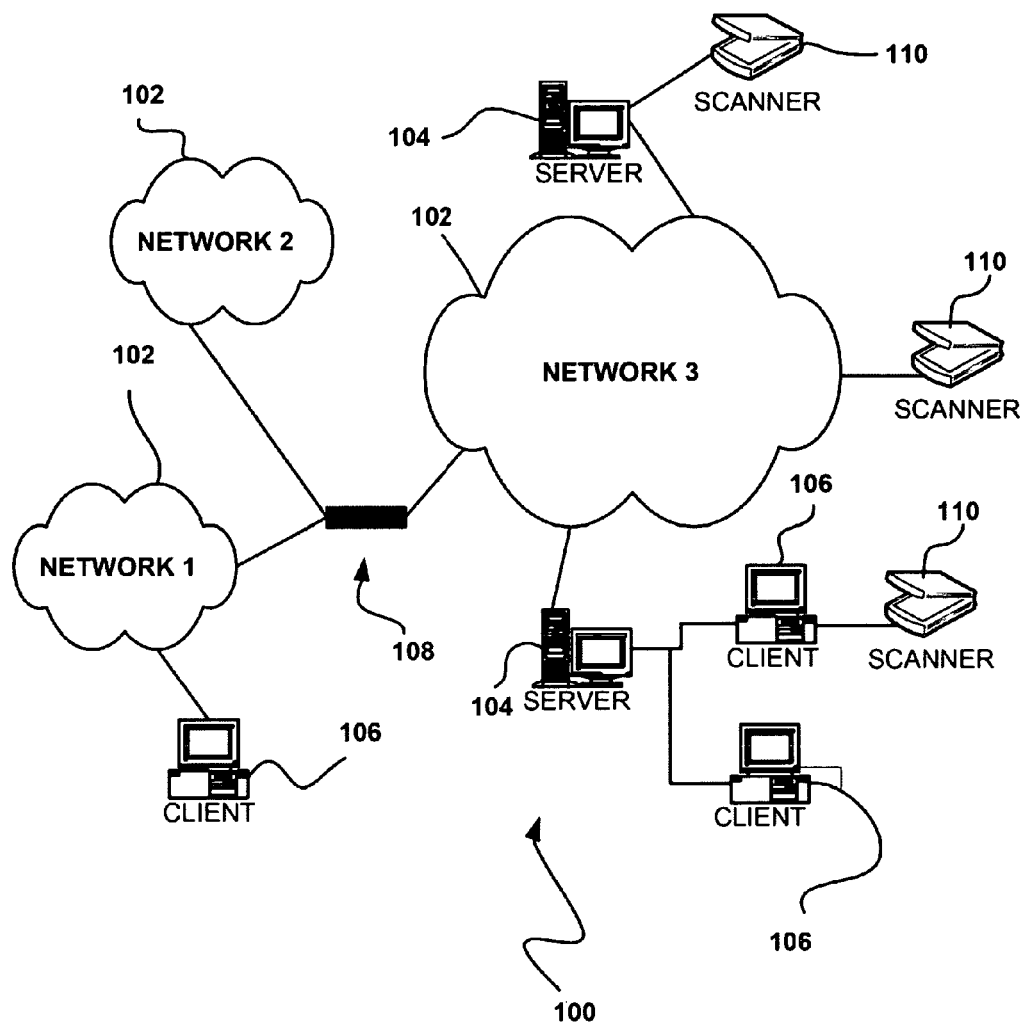
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

One or more scanners 110 may be coupled to a network, a server 104 and/or a client 106. The scanner(s) 110 may be accessible by the attached machine and/or remotely by other machines via any interconnection path.

Figure 2:
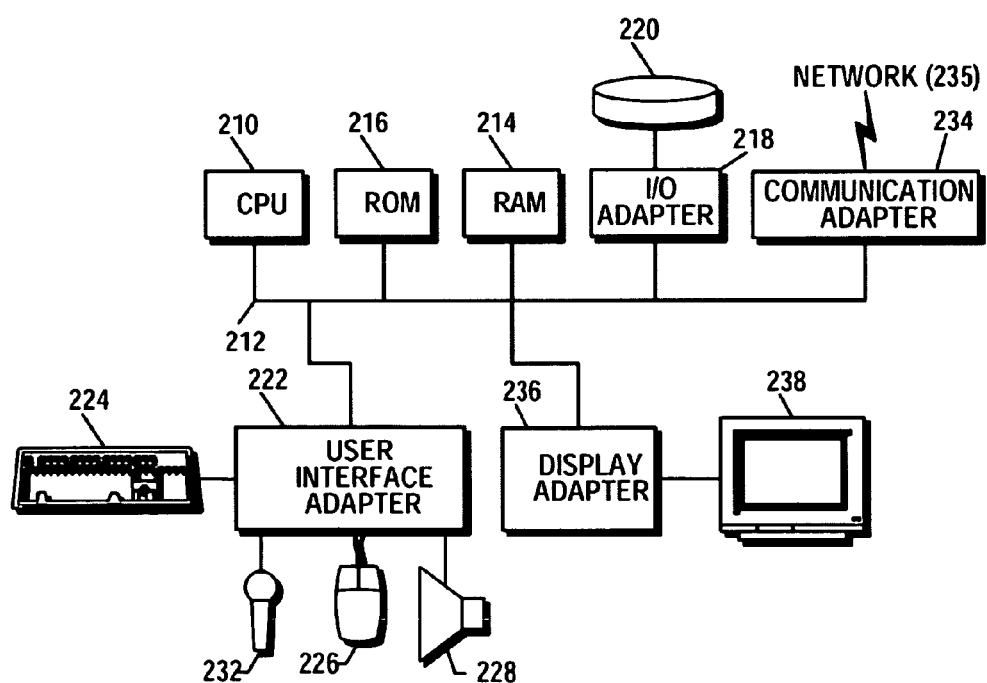
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
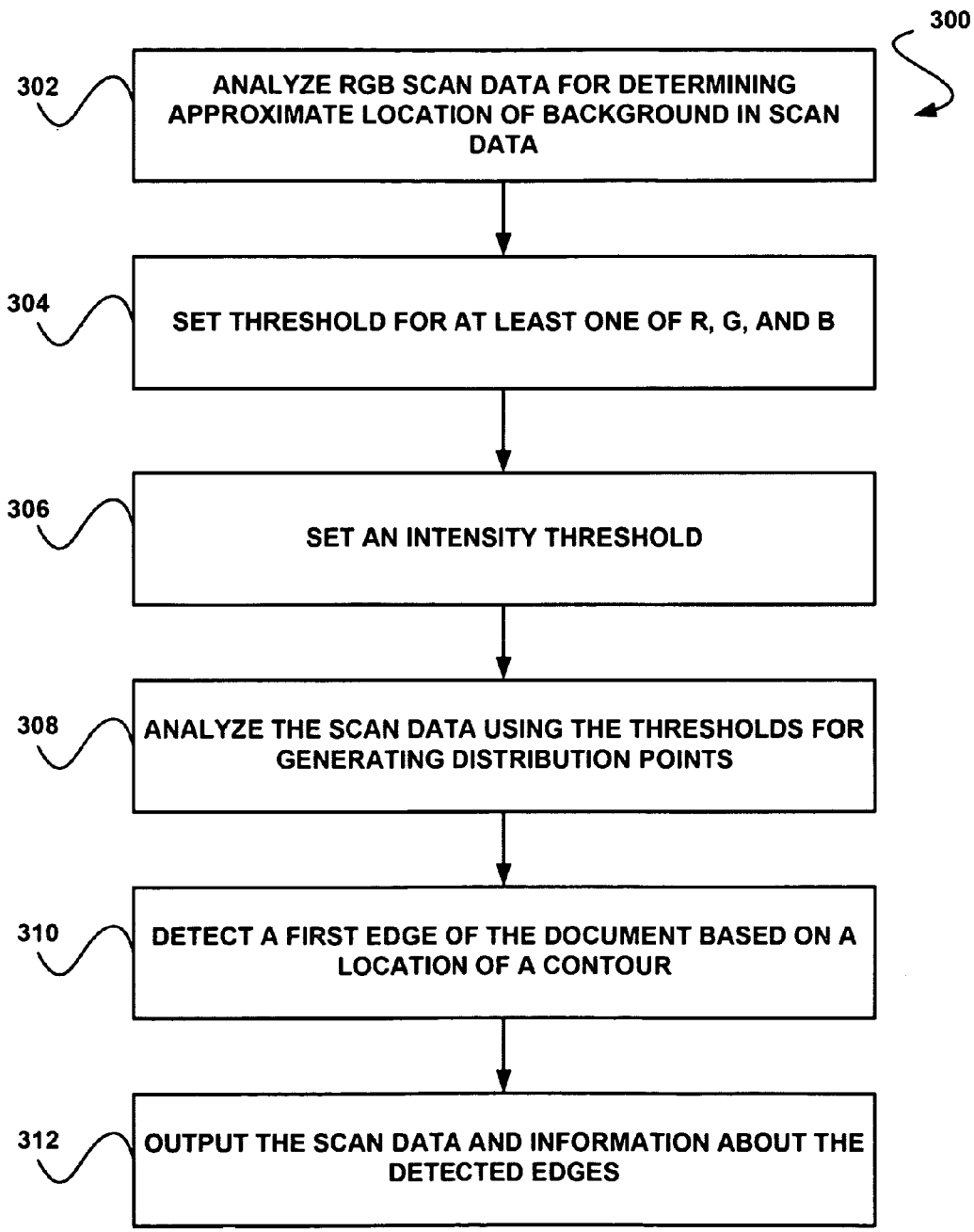
FIG. 3 shows a method for detecting an edge in scan data, in accordance with one embodiment.

FIG. 3 shows a method 300 for detecting an edge in scan data, in accordance with one embodiment. As an option, the method 300 may be carried out in the context of the architecture and environment of FIGS. 1 and/or 2. Of course, however, the method 300 may be carried out in any desired environment.

As shown in operation 302, RGB scan data is analyzed for determining an approximate location of a background in the scan data representing a, background adjacent a document having a similar color as the background. Additionally, in operation 304, a threshold is set for at least one of R, G and B, where the threshold is based in part on RGB values of the background and a predefined color threshold.

Further, in operation 306, an intensity threshold is set. Further still, in operation 308, the scan data is analyzed using the thresholds for generating distribution points. Also, in operation 310, a first edge of the document is detected based on a location of a contour in the distribution points. In addition, in operation 312, the scan data and information about the detected edges is output.

Figure 4:
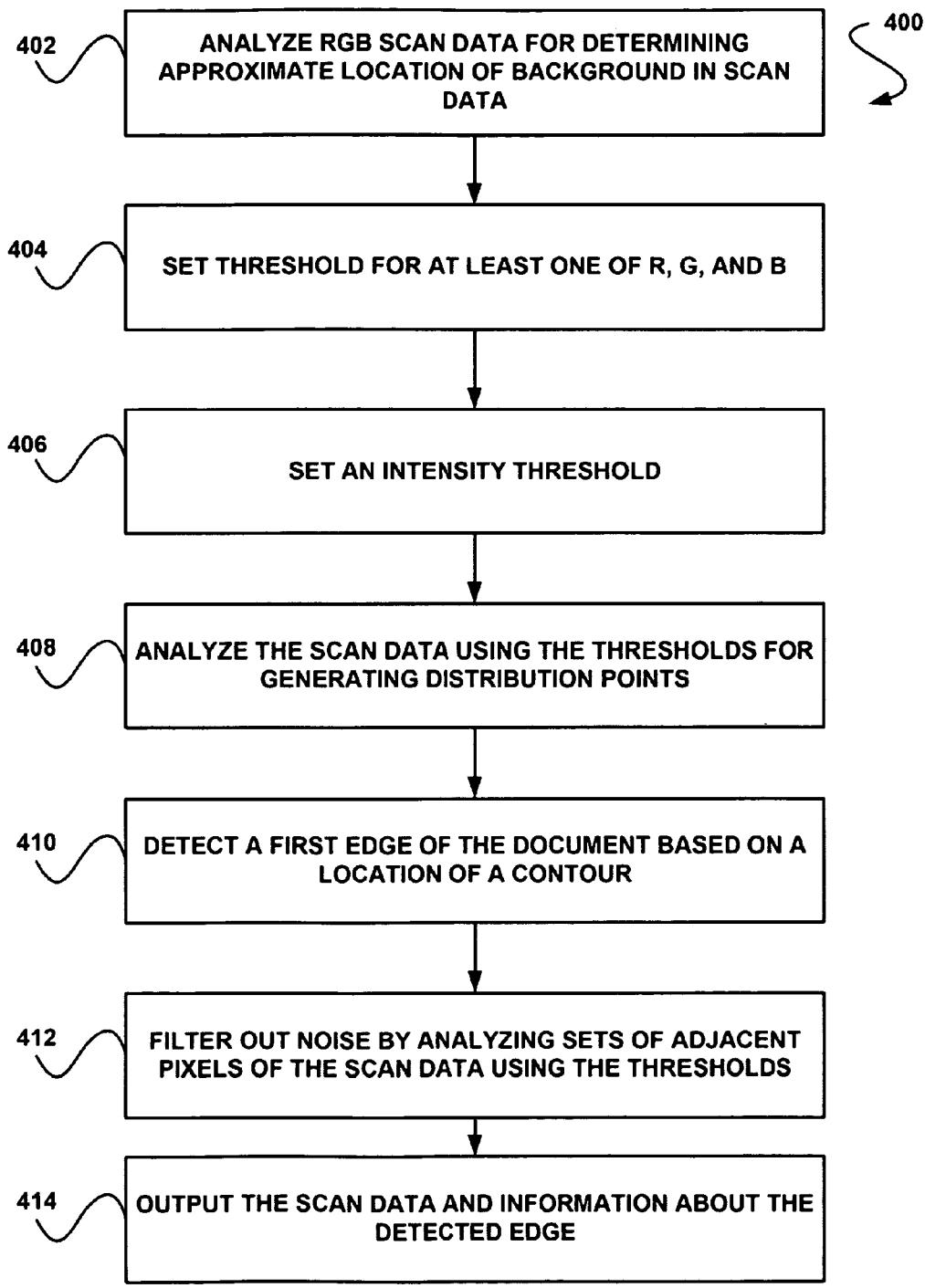
FIG. 4 a method for detecting an edge in scan data, in accordance with another embodiment.

FIG. 4 illustrates a method 400 for detecting an edge in scan data, in accordance with another embodiment. As an option, the method 400 may be implemented in the context of the architecture and environment of FIGS. 1-3. Of course, however, the method 400 may be implemented in any desired environment. Yet again, it should be noted that the aforementioned definitions may apply during the present description.

As shown in operation 402, RGB scan data is analyzed for determining an approximate location of a background in the scan data representing a background adjacent a document having a similar color as the background. Additionally, in operation 404, a threshold is set for at least one of R, G and B.

Further, in operation 406, an intensity threshold is set, wherein the intensity threshold is set below a predefined color threshold. Further still, in operation 408, the scan data is analyzed using the thresholds for generating distribution points. Also, in operation 410, a first edge of the document is detected based on a location of a contour in the distribution points.

In addition, in operation 412, noise is filtered out by analyzing sets of adjacent pixels of the scan data using the thresholds. Furthermore, in operation 414, the scan data and information about the detected edge are output.

Scan Data

In the context of the present description, the RGB scan data may include any data including red (R), green (G), and blue (B) color components that is obtained as a result of scanning the document. For example, the RGB scan data may include RGB color model data for one or more portions of the document.

In one embodiment, the RGB scan data may be the result of the scanning of the document. For example, one or more image sensors, charge-coupled devices (CCDs), contact image sensors (CISs), photomultiplier tubes (PMTs), or other portions of scanning devices such as automated document feeder (ADF) scanners, flatbed scanners, etc. may obtain optical images of one or more portions of the document and background and/or convert all or part of the optical images into the scan data. In another example, the RGB scan data may include 24-bit color data captured by the scanning device. In yet another example, the scan data may be stored in a buffer.

Additionally, in one embodiment, the document may include any medium that is able to be scanned. For example, the document may include a shape, an image, text, etc. In another embodiment, the document may include any color scheme. For example, the document may include one or more colors, may be black and white, may be grayscale, etc. Further, in one embodiment, the background may include one or more portions of the area surrounding the document.

Determining the Background

In another embodiment, analyzing the RGB scan data for determining the approximate location of the background may include comparing RGB values to a background threshold value for a number of consecutive pixels, where if the RGB data of each of the consecutive pixels is below the background threshold value, the consecutive pixels are determined to be in the background. In yet another embodiment, the number of consecutive pixels may vary according to the resolution of the scanned image.

For example, the number of consecutive pixels needed to be below the background threshold value for scan data with a resolution of 200 dots per inch (DPI) may be smaller than the number of consecutive pixels needed to be below the background threshold value for scan data with a resolution of 400 DPI. In another example, a single distortion pixel at 200 DPI may appear as three or more distortion pixels at 400 DPI. By increasing the number of consecutive pixels needed to be below the background threshold value for scan data with a greater resolution, streaks in the RGB scan data caused by an error in calibration or a bad pixel or dust in the scanning device may be accurately ignored.

Additionally, in one embodiment, the document may be the same color as the background or a similar color as the background. In another embodiment, one or more portions of the document may be the same color as the background or a similar color as the background. For example, the border of the document may be the same color as the background.

In another embodiment, the locations of multiple backgrounds may be determined. For example, multiple scanning devices that scan from left to right and right to left may determine backgrounds for the left and right sides of the RGB scan data, respectively. Additionally, in yet another embodiment, a center alignment of the RGB scan data, the document, the background, etc. may be performed based on the location of the multiple backgrounds.

Further, in one embodiment, average background RGB values may be calculated based on the RGB values of two or more portions of the background. For example, the average of the RGB values for each pixel determined to be in the background may be determined. In another example, the average of the RGB values for a row of pixels in the background may be determined. In this way, deviations based on varying background RGB values may be minimized.

Further still, in one embodiment, a background intensity may be calculated. In another embodiment, the background intensity may be calculated based on one or more RGB values of the background. For example, the background intensity may be calculated based on the average background RGB values. In another example, the background intensity may be calculated based on the average RGB values for a row of pixels.

In yet another example, the background intensity may be part of a YUV color model (e.g., the luma/brightness/Y component of the YUV color model) that is derived from the RGB values of the background. For example, an RGB transformation matrix or other color space conversion standard may be used to obtain YUV values from background RGB values.

Setting Thresholds

Additionally, in one embodiment, the predefined color threshold and a predefined intensity threshold may relate to a difference between the document and the background. For example, the predefined color threshold may include an R, G, or B value representing the difference in color between the respective R, G, or B values of the background and document color elements. In another example, the predefined intensity threshold may include an intensity value representing the difference in intensity between the background and document color elements.

In another embodiment, the predefined color threshold and the predefined intensity threshold may relate to a particular device. For example, the predefined color threshold and the predefined intensity threshold for the particular device may be selected from a list or other data repository.

In yet another embodiment, the threshold for at least one of R, G, and B may be set by combining one or more of the RGB values of the background and the predefined color threshold. For example, the threshold for at least one of R, G, and B may be determined by averaging the at least one of R, G, and B determined for the background and adding the predefined color threshold for the at least one of R, G, and B to the average.

Further, in another embodiment, the intensity threshold may be based in part on the background intensity and the predefined intensity threshold. For example, the intensity threshold may be set by combining the background intensity with the predefined intensity threshold. In yet another embodiment, the predefined intensity threshold may be set below the predefined color threshold. In this way, the accuracy of the analyzing of the scan data may be increased due to the fact that the intensity threshold may be more sensitive than the threshold for at least one of R, G, and B during the analyzing.

In another embodiment, the threshold for at least one of R, G, and B may be determined for one or more lines of RGB scan data by averaging the at least one of R, G, and B determined for the background for the lines of RGB scan data and adding the predefined color threshold for the at least one of R, G, and B to the average for the lines of RGB scan data. Additionally, the intensity threshold may be determined for one or more lines of RGB scan data. For example, the intensity threshold for the one or more lines of RGB scan data may be determined by calculating the intensity of the background from the average of the RGB values from the one or more lines of RGB scan data and adding the predefined intensity threshold to the intensity of the background.

As a result, the threshold for the intensity and/or at least one of R, G, and B may calculated each time the one or more lines of RGB scan data are retrieved, thereby enabling the determination of dynamic, instantaneous threshold values for the one or more lines of RGB scan data. In this way, the threshold values may be recalibrated with every scan to account for time, temperature, and other variable conditions. Additionally, the threshold values may be kept as low as possible, which may increase the quality of the processed scan data.

Filtering Noise in the Scan Data

In another embodiment, noise in the RGB scan data may be filtered. For example, sets of adjacent pixels of the scan data may be analyzed using the thresholds. In another embodiment, the filtering may use a sliding window lookahead filter. For example, the filtering may look ahead in the RGB scan data by buffering one or more pixels of the RGB scan data.

In another embodiment, one or more rules may be applied to the buffered pixels. For example, eight pixels of the RGB scan data may be buffered, and if fewer than six pixels in the buffer surpass the intensity threshold and/or the threshold for at least one of R, G, and B, the pixels that do surpass the respective buffers may be determined to be part of the background and/or ignored when detecting the first edge of the document.

In another example, if six or more pixels in the buffer surpass the intensity threshold and/or the threshold for at least one of R, G, and B, the pixels that do surpass the respective buffers may be determined to be the first edge of the document. In this way, streaks, dust, dead pixels, and other imperfections in the RGB scan data may be avoided during the analysis of the scan data.

Analyzing the Scan Data

In addition, in one embodiment, analyzing the RGB scan data may include comparing one or more portions of the scan data against the thresholds. For example, one or more of the intensity and the R, G, and B values determined for one or more pixels in the scan data may be compared against the intensity threshold and/or the threshold for at least one of R, G, and B.

In another embodiment, the difference determined between these values may be used in generating the distribution points. For example, the value of the distribution points may correspond to the difference between the threshold values and one or more of the intensity and the R, G, and B values for one or more pixels in the scan data. In another example, the intensity of adjacent pixels may rise as the document is reached in the scan data.

Further, in another embodiment, the distribution points may be organized. For example, the distribution points may be graphed, placed in a table, etc. In yet another embodiment, one or more contours may be identified in the organization. For example, distribution points that gradually increase or decrease in value for successive pixels may indicate a gradual respective increase or decrease in the difference between the threshold values and one or more of the intensity and the R, G, and B values for successive pixels in the scan data. In another example, this progressive increase or decrease in value for successive pixels may be identified as one or more contours visible in the organization.

Figure 5:
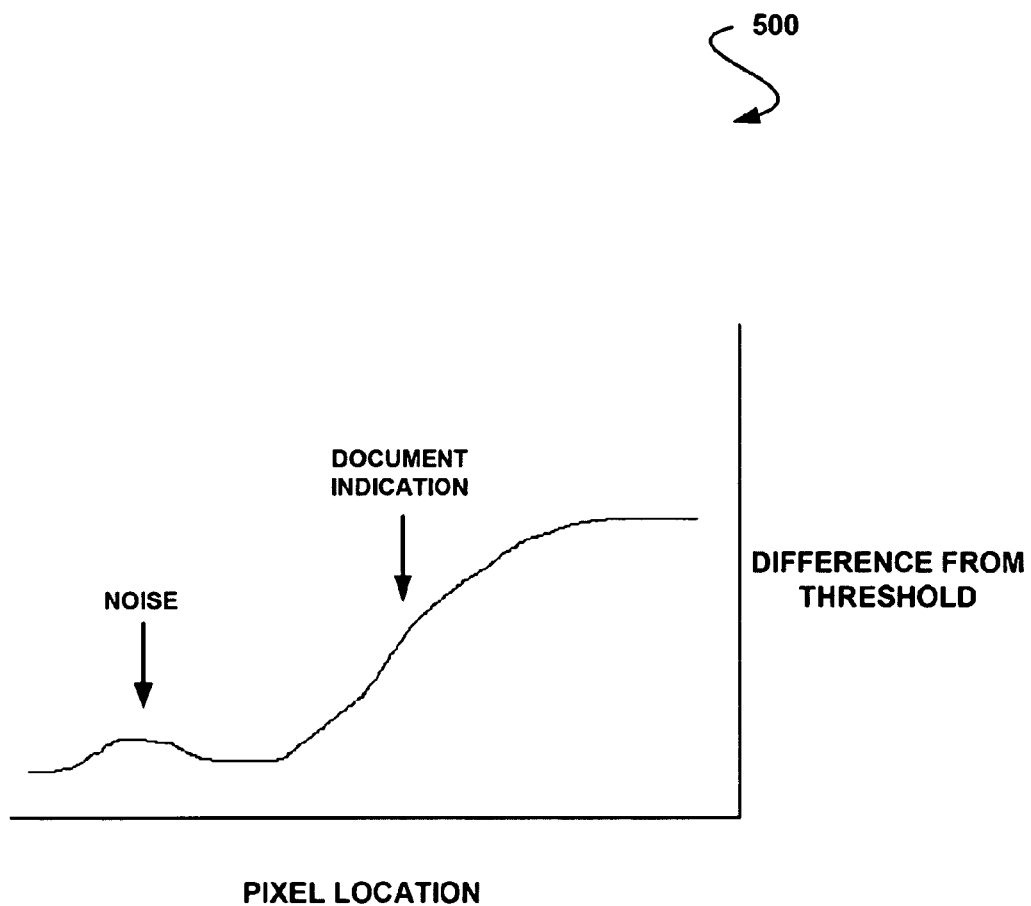
FIG. 5 shows an example of the organization of distribution points, in accordance with yet another embodiment.

In still another embodiment, the filtering may include analyzing the distribution points, wherein anomalies outside the contour are determined to be noise. In this way, imperfections in the RGB scan data may be avoided during the analysis of the scan data. In yet another embodiment, all or some of the scan data may be buffered in hardware, such that firmware may never encounter the anomalies. An example of the organization of distribution points 500 is shown in FIG. 5.

Additionally, in one embodiment, detecting the first edge of the document may include weighing one or more distribution points. For example, a hardware counter may assign a weight to each distribution point corresponding to the confidence that the pixel represented by the distribution point is part of the document, part of the background, etc. In another embodiment, detecting the first edge of the document may include creating a histogram based on the weighted values.

In this way, by accurately determining the first edge of the document, the sensitivity of the analysis performed on the scan data may be heightened when the start of the document is determined in the scan data, thereby increasing the quality and accuracy of the document location in the scan data, in addition to increasing the efficiency of the analysis. This may result in a more well-defined first edge for firmware analysis to work with.

Further, in another embodiment, a color of the document may be inverted. In yet another embodiment, all or part of the scan data may be converted. For example, the scan data may be converted to display a white document on a black background, which may be sent to one or more firmware algorithms for performing cropping, skewing, etc. a white document on a black background.

Detecting a Second Edge

Further still, in one embodiment, a second edge of the document may be detected. In the context of the present embodiment, the second edge may include the edge of the document opposite the first edge of the document in the direction of the performed scan. In another embodiment, the second edge of the document may be found by detecting the background adjacent the second edge of the document.

In yet another embodiment, the second edge of the document may be found by analyzing the RGB scan data of the document. For example, the intensity and/or the R, G, and B values determined for one or more pixels in the scan data may be compared against the intensity threshold and/or the threshold for at least one of R, G, and B, and the resultant distribution points may be analyzed in order to determine one or more contours indicative of a gradual decrease in the difference between the threshold values and one or more of the intensity and the R, G, and B values for successive pixels in the scan data.

In still another embodiment, when the second edge is detected, analysis of the scan data past the second edge may not include analysis of the intensity of the scan data. In another embodiment, analysis of the intensity of the scan data may stop for the duration of a streak or other imperfection is detected in the scan data and may resume after analysis of the imperfection has ended.

For example, RGB values may be compared to a background threshold value for a number of consecutive pixels, where if the RGB data of each of the consecutive pixels is above the background threshold value, the consecutive pixels are determined to be in the document. In yet another embodiment, the number of consecutive pixels may vary according to the resolution of the scanned image. For example, the number of consecutive pixels needed to be above the background threshold value for scan data with a resolution of 200 dots per inch (DPI) may be smaller than the number of consecutive pixels needed to be below the background threshold value for scan data with a resolution of 400 DPI. In this way, the edge detection accuracy may be improved, and noise in the scan data may be avoided during the analysis of the scan data.

In addition, the information about the detected edges may include the location of the detected edges, the confidence of the location of the detected edges, the distance between the detected edges, and any other information about the detected edges derived from the RGB scan data.

In another embodiment, all or part of the analyzing, detecting, and outputting may be performed in hardware. In this way, speed degradation may be avoided. Of course, however, all or part of the analyzing, detecting, and outputting may be performed in software.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

The invention can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, non-volatile memory device, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting an edge in scan data, comprising:
    analyzing RGB scan data for determining an approximate location of a background in the scan data representing a background adjacent a document having a similar color as the background;
    setting a threshold for at least one of R, G, and B, the threshold being based in part on RGB values of the background and a predefined color threshold;
    setting an intensity threshold;

analyzing the scan data using the thresholds for generating distribution points;

detecting a first edge of the document based on a location of a contour in the distribution points; and outputting the scan data and information about the detected edge.

2. The method of claim 1, wherein analyzing the RGB scan data for determining the approximate location of the background includes comparing RGB values to a background threshold value for a number of consecutive pixels, wherein if the RGB data of each of the consecutive pixels is below the background threshold value, the consecutive pixels are determined to be in the background.

3. The method of claim 1, wherein the intensity threshold is based in part on a background intensity and a predefined intensity threshold.

4. The method of claim 3, wherein the predefined intensity threshold is set below the predefined color threshold.

5. The method of claim 1, further comprising filtering out noise by analyzing sets of adjacent pixels of the scan data using the thresholds.

6. The method of claim 5, wherein the filtering uses a sliding window lookahead filter.

7. The method of claim 5, wherein the filtering includes analyzing the distribution points, wherein anomalies outside the contour are determined to be noise.

8. The method of claim 1, further comprising inverting a color of the document.

9. The method of claim 1, further comprising detecting a second edge of the document.

10. The method of claim 9, wherein the second edge of the document is found by analyzing the RGB scan data of the document.

11. The method of claim 9, wherein the second edge of the document is found by detecting the background adjacent the second edge of the document.

12. A method for detecting an edge in scan data, comprising:

analyzing RGB scan data for determining an approximate location of a background in the scan data representing a background adjacent a document having a similar color as the background;

setting a threshold for at least one of R, G, and B;

setting an intensity threshold, wherein the intensity threshold is set below a predefined color threshold;

analyzing the scan data using the thresholds for generating distribution points;

detecting a first edge of the document based on a location of a contour in the distribution points;

filtering out noise by analyzing sets of adjacent pixels of the scan data using the thresholds; and outputting the scan data and information about the detected edge.

13. The method of claim 12, wherein analyzing the RGB scan data for determining the approximate location of the background includes comparing RGB values to background threshold value for a number of consecutive pixels, wherein if the RGB data of each of the consecutive pixels is below the background threshold value, the consecutive pixels are determined to be in the background.

14. The method of claim 12, wherein the filtering uses a sliding window lookahead filter.

15. The method of claim 12, wherein the filtering includes analyzing the distribution points, wherein anomalies outside the contour are determined to be noise.

16. The method of claim 12, further comprising inverting a color of the document.

17. The method of claim 12, further comprising detecting a second edge of the document.

18. The method of claim 17, wherein the second edge of the document is found by analyzing the RGB scan data of the document.

19. The method of claim 17, wherein the second edge of the document is found by detecting the background adjacent the second edge of the document.

20. The method of claim 12, wherein the threshold for the at least one of R, G and B is based in part on RGB values of the background and a predefined color threshold.

21. The method of claim 12, wherein the threshold for the at least one of R, G and B is based in part on RGB values of the background and a predefined color threshold.

22. A computer program product for detecting an edge in scan data, comprising:

a non-transitory computer readable medium having computer code stored thereon, the computer code including computer code which when executed by a processor causes the processor to perform the method of claim 12.

23. A system for detecting an edge in scan data, comprising:

hardware for performing the method of claim 12.

24. A computer program product for detecting an edge in scan data, comprising:

a non-transitory computer readable medium having computer code stored thereon, the computer code including:

computer code for analyzing RGB scan data for determining an approximate location of a background in the scan data representing a background adjacent a document having a similar color as the background;

computer code for setting a threshold for at least one of R, G, and B, the threshold being based in part on RGB values of the background and a predefined color threshold;

computer code for setting an intensity threshold; computer code for analyzing the scan data using the thresholds for generating distribution points;

computer code for detecting a first edge of the document based on a location of a contour in the distribution points; and computer code for outputting the scan data and information about the detected edge.

25. A system for detecting an edge in scan data, comprising:

hardware for analyzing RGB scan data for determining an approximate location of a background in the scan data representing a background adjacent a document having a similar color as the background;

hardware for setting a threshold for at least one of R, G, and B, the threshold being based in part on RGB values of the background and a predefined color threshold;

hardware for setting an intensity threshold;

hardware for analyzing the scan data using the thresholds for generating distribution points;

hardware for detecting a first edge of the document based on a location of a contour in the distribution points; and hardware for outputting the scan data and information about the detected edge.

* * * * *